(12) United States Patent
Shiba

(10) Patent No.: US 7,232,981 B2
(45) Date of Patent: Jun. 19, 2007

(54) SYSTEM AND A METHOD FOR DISPLAYING AN IMAGE CAPTURED BY A SENSOR ARRAY

(75) Inventor: Yoshifumi Shiba, Tokyo (JP)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/798,815

(22) Filed: Mar. 10, 2004

(65) Prior Publication Data

US 2005/0200735 A1 Sep. 15, 2005

(51) Int. Cl.
*H04N 5/222* (2006.01)

(52) U.S. Cl. .............................. 250/208.1; 348/333.01

(58) Field of Classification Search .................. 348/96, 348/155, 302, 308, 321, 333.01, 240, 240.2; 250/208.1; 382/305, 312
See application file for complete search history.

(56) References Cited

U.S. PATENT DOCUMENTS

| | | | | |
|---|---|---|---|---|
| 5,428,390 A | * | 6/1995 | Cooper | 348/240.2 |
| 6,512,858 B2 | * | 1/2003 | Lyon | 382/305 |
| 2002/0122121 A1 | * | 9/2002 | Fujii | 348/240 |

* cited by examiner

*Primary Examiner*—Thanh X. Luu
*Assistant Examiner*—Tony Ko
(74) *Attorney, Agent, or Firm*—Harrington & Smith, PC

(57) ABSTRACT

A system for displaying an image captured by a sensor array reduces physical movement of the camera. The system includes means for displaying an image corresponding to an output from a plurality of sensors within a first area of a sensor array and means for changing the image displayed by translating the first area within the sensor array as by changing the grouping of the sensors whose image data is displayed.

25 Claims, 4 Drawing Sheets

|   |   |   |   |   |   |
|---|---|---|---|---|---|
| 1 | 2 | 3 | 4 | 5 | 6 |
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

(c)

|   |   |   |   |
|---|---|---|---|
| 3 | 4 | 5 | 6 |
| 9 | 10 | 11 | 12 |
| 15 | 16 | 17 | 18 |
| 21 | 22 | 23 | 24 |

(d)

|   |   |
|---|---|
| 10 | 11 |
| 16 | 17 |

SYSTEM AND A METHOD FOR DISPLAYING AN IMAGE CAPTURED BY A SENSOR ARRAY

FIELD OF THE INVENTION

Embodiments of the present invention relate to a system and a method for displaying an image captured by a sensor array. In particular, they relate to a system and a method for displaying an image captured by a sensor array in a digital camera.

BACKGROUND TO THE INVENTION

Digital cameras are used to capture and store images for viewing in a display. The image is usually viewed on a display while the image is being captured or viewed at a later time when the image is read from a memory. To capture a different image it is necessary to physically move the camera to alter its inclination or bearing. This may be achieved by physically handling the camera or by controlling the cameras inclination and/or bearing using a motorised tripod.

One problem associated with physically handling a camera is that the operator's hands may be unsteady, resulting in a blurred image. If the images are combined to form a video, the video may be shaky and unpleasant to watch. One problem associated with controlling a camera using a motorised tripod is that it consumes electrical power.

It is therefore desirable to provide an alternative system for controlling a display of a camera.

BRIEF DESCRIPTION OF THE INVENTION

According to one aspect of the present invention there is provided a system for displaying an image captured by a sensor array, the system comprising: means for displaying an image corresponding to an output from a plurality of sensors within a first area of a sensor array; means for changing the image displayed by translating the first area within the sensor array, thereby changing the plurality of sensors.

One advantage provided by embodiments of the present invention is that it may reduce the physical movement of a camera. This is because the user may translate the first area within the sensor array to produce a different image. This corresponds to changing the cameras inclination or bearing to produce a different image.

The means for displaying an image may control the sensor array to provide an output from only the plurality of sensors within the first area of the sensor array. One advantage provided by this embodiment is that the system does not have to store a large image corresponding to the output from the whole of the sensor array. This may help to reduce the memory needed in the system to store the images.

The system may comprise a buffer for storing an output from all the sensors of the sensor array. The means for displaying an image may receive the stored output from the buffer and process the stored output to create an image corresponding to an output from the plurality of sensors within the first area of the sensor array. An advantage provided by this embodiment is that the buffer enables the system to capture data at a rate greater than the processing rate of the means for displaying an image.

The system may comprise a memory for receiving and storing an image for receiving and storing the output of the plurality of sensors within the first area of the sensor array. The memory provides an advantage in that it allows a user to view the image at a later time.

The system may comprise a user input device for controlling the translation of the first area within the sensor array. The user input device may control translation in a first direction and independent translation in a second direction, substantially perpendicular to the first direction. The user input device may be arranged to resize the first area. The user input device may be arranged to simultaneously resize and translate the first area. The user input device may be an integral component of the system or may be remote from the system. The user input device may be connected to the system via a wireless link such as a low power radio frequency link. The user input device may be keypad, a joystick or a touch sensitive screen.

One benefit provided by the resizing and translation of the first area of the sensor array is that it provides the user with a greater level of control and further reduces the need to move the digital camera or the motorised tripod.

The means for displaying an image may comprise a processor.

According to another aspect of the present invention there is provided a method for controlling a display, the method comprising: displaying an image corresponding to an output from sensors within a first area of a sensor array; displaying a different image in response to a user input that is equivalent to translating the first area within the sensor array.

According to a further aspect of the present invention there is provided a system for controlling a display, the system comprising an input for receiving an image from a sensor comprising an N×M array of light sensors; a processor for controlling a display to display an image comprising an n×m array of pixels corresponding to a n×m subset of the N×M array of light sensors, wherein the corresponding n×m subset is changeable in response to a user input to vary the image for display.

For a better understanding of the present invention reference will now be made by way of example only to the accompanying drawings in which:

BRIEF DESCRIPTION OF THE DRAWINGS

FIG. 4 illustrates a display output of embodiments of the present invention used in combination with digital zoom.

DETAILED DESCRIPTION OF EMBODIMENTS OF THE INVENTION

Figures 1A, 1B:
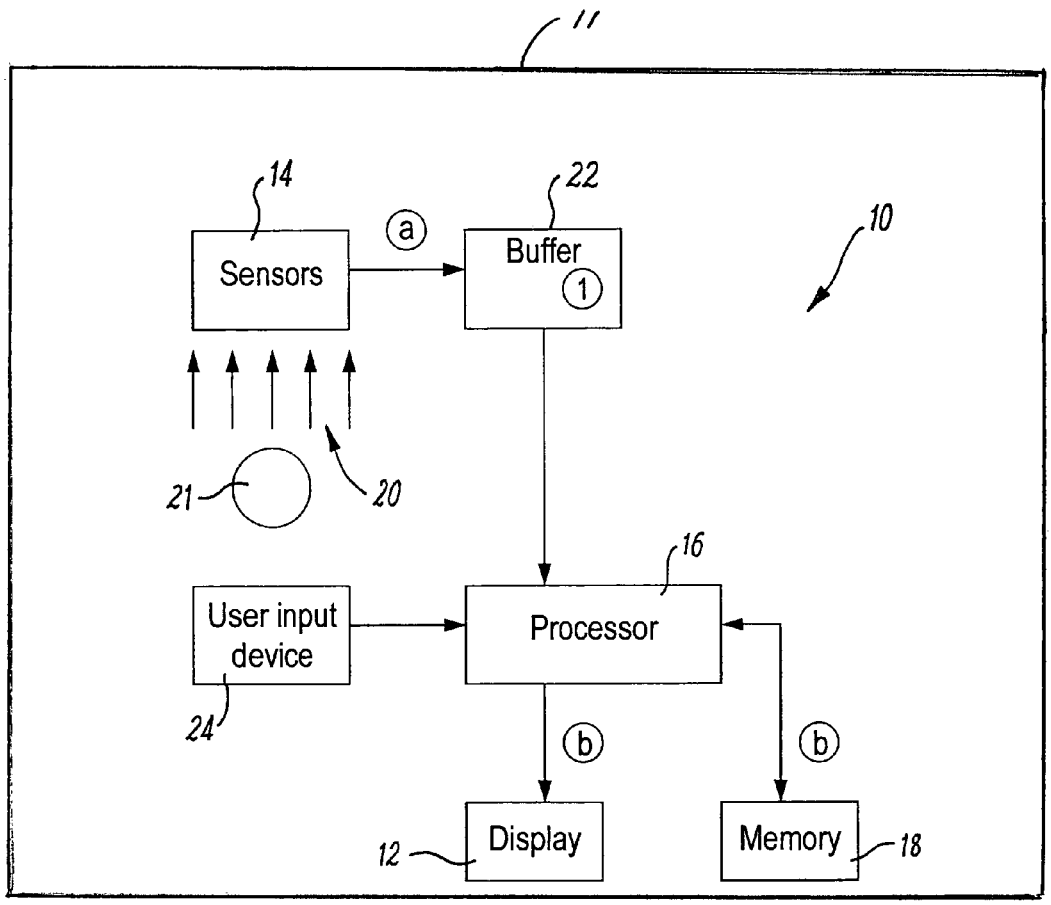
FIGS. 1A & 1B illustrate schematic diagrams of a first embodiment of the present invention.

The figures illustrate a system 10 for displaying an image captured by a sensor array 14, the system 10 comprising: means for displaying an image 16 corresponding to an output from a plurality of sensors within a first area of a sensor array 14; means for changing the image displayed 16 by translating the first area within the sensor array 14, thereby changing the plurality of sensors. A processor 16 may provide the means for displaying an image 16 and the means for changing the image displayed.

FIG. 1A illustrates a system 10 for displaying an image captured by a sensor array 14 according to a first embodiment of the present invention. The system 10 comprises a plurality of sensors arranged as a sensor array 14, a buffer memory 22, a processor 16, a user input device 24, a display 12 and a memory 18.

The system 10 may be comprised wholly or partly in a portable handheld device 11, such as a mobile phone, a digital camera, or a personal digital assistant (PDA), or may be a personal computer. The system 10 may be a component of a digital camera, or an electronic device that displays images captured by a digital camera or has a digital camera integrated into it.

The sensor array 14 may comprise any suitable light sensors and may, for example comprise charge coupled devices (CCD's) or complementary metal oxide semiconductor (CMOS) sensors. The sensor array captures an image as image data. This data typically comprises a data element (word) for each sensor of the sensor array 14. Each data element represents the intensity of the light sensed by the respective sensor.

The image data is output from the sensor array 14 to the buffer memory 22, which temporarily stores the image data before it is processed by the processor 16. This enables the system 10 to capture data at a rate that is greater than the processing rate of the processor 16 until the buffer memory 22 overflows.

The processor 16 is connected to the user input device 24 from which it receives command signals. The user input device 24 may be any suitable user input device and may, for example be a keypad, a joystick or a touch sensitive screen. In the illustrated example, the user input device 24 is an integral component of the system 10. However, in other implementations it may be separate and remote, and connectable to the processor 16 via a wireless link such as a low power radio frequency link.

The processor 16 is connected to control the operation of the display 12. The display 12 may be any suitable display and may for example be a liquid crystal display (LCD) or a thin film transistor (TFT) display. The content of the display 12 is determined by display data provided by the processor 16. The display data is a sub-set of the image data.

The processor 16 is connected to write to and read from the memory 18. The processor 16 is operable to store the image data and/or display data in the memory for future use. The memory 18 may be any suitable memory and may, for example be built-in permanent memory such as flash memory or it may be a removable memory such as a secure digital (SD) card or a micro-drive.

The system 10 is arranged so that light, incident on the plurality of sensors 14, is converted into image data and then processed by a processor 16 in response to a user input from the user input device 24 to produce display data that determines the image displayed on the display 12.

In more detail, FIG. 1A illustrates that the sensor array 14 receives light (represented by arrows 20) from at least one source 21 and produces image data (a). The sensor array is an N×M array of sensors and the image data may be represented as a N×M array of data elements as illustrated in FIG. 1B, where each data element corresponds to a respective sensor output. In the example of FIG. 1B, the sensor array is illustratively a 4×4 array of sensors and the image data (a) is represented as a 4×4 array of data elements which are numbered 1 to 16. The image data is stored in the buffer memory 22.

The processor 16 reads the image data from the buffer 22 and operates on it to produce the display data (b) illustrated in FIG. 1B. The operation involves selecting a sub-set from the data elements of the image data. This sub-set corresponds to a first area of the sensor array 14. The first area is an n×m area of contiguous sensors in the sensor array 14 and the sub-set is the nm data elements corresponding to the output of the sensors within the first area.

The image data (b) is then sent to the display 12 for display. Typically, the size of the first area (n×m) corresponds to the size of the display and each data element of the display data is used to control the intensity of a pixel in the display.

In the example of FIG. 1B, the display is a 2×2 array of pixels, and the first area is a 2×2 array of sensors within the top right corner of the sensor array 14. The image data displayed therefore corresponds to the image data elements 3, 4, 7, 8. The 2×2 display is merely illustrative, typically displays will be much larger e.g. an array of 1600×1200 pixels (1,920,000 pixels in total).

The user input device 24 allows a user to change display data (b) without changing the image data (a). A user may translate the first area within the sensor array 14 to display a different area of the sensor array.

The user may use the user input device 24 to select, as the display data, a different sub-set from the data elements of the image data. This different sub-set corresponds to a translation of the first area within the sensory array 14. For example, if the user provides a 'left' command, the first area is translated one to the left so that the display data comprises the image data elements 2, 3, 6 and 7. If the user instead provides a 'down' command, the first area is translated one down so that the display data comprises the image data elements 7, 8, 11 and 12. Therefore, a user may selectively choose which 2×2 area of the 4×4 sensor array 14 provides input to the 2×2 display. This may help to reduce the physical movement of the camera when the user wants to change the final image.

Figure 2A:
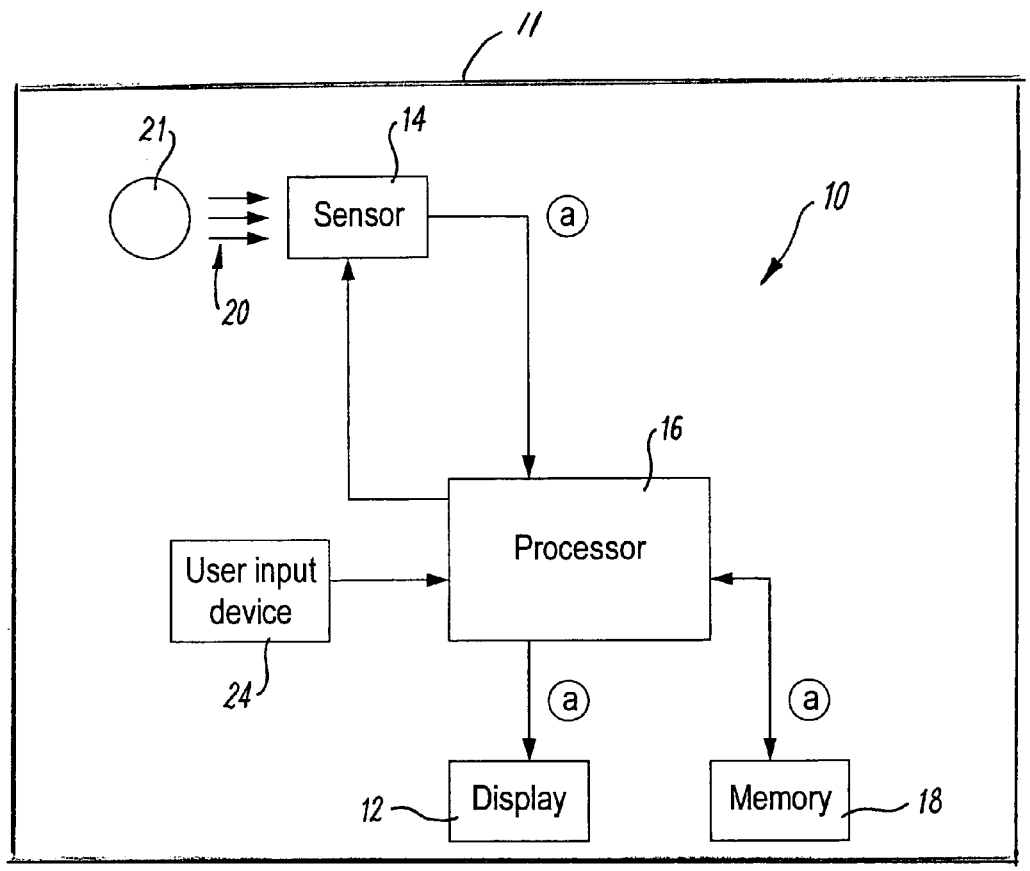
FIGS. 2A & 2B illustrate schematic diagrams of a second embodiment of the present invention.

FIG. 2A illustrates a system 10 for controlling a display 12 according to a second embodiment of the present invention. The system 10 is substantially similar to the system 10 illustrated in FIG. 1A and operates in a similar manner. Where the features of FIG. 2A correspond to the features of FIG. 1A, the same reference numerals are used.

The system 10 illustrated in FIG. 2A differs from that illustrated in FIG. 1A in that it does not comprise a buffer memory for storing image data from all the sensors of the sensor array 14. In this embodiment, the processor 16 selectively reads image data from the sensor array 14 which is then used as display data. The display data may be stored in memory 18 or displayed in the display 12. It is not necessary for the system 10 to comprise a buffer memory 22 because the processor controls the output of the sensor array 14.

The processor 16 obtains an output from only a sub-set of the sensors within the sensor array. The sub-set corresponds to a first area of the sensor array 14. The first area is an n×m area of contiguous sensors in the sensor array 14 and the image data (display data) is the nm data elements corresponding to the output of the sensors within the first area.

Figure 2B:
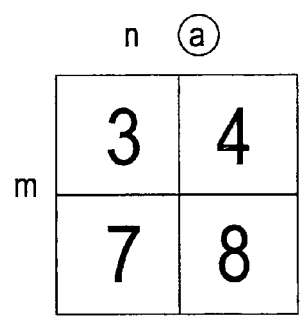

The user input device 24 allow a user to change display data by changing the image data. A user may translate the first area within the sensor array 14 to obtain different image data from different areas of the sensor array 14. For example, if the display data is originally 3, 4, 7, 8 as illustrated in FIG. 2B, and a user provides a 'left' command, the first area is translated one to the left so that the image data (display data) comprises the data elements 2, 3, 6 and 7. If the user instead provides a 'down' command, the first area is translated one down so that the image data (display data) comprises the data elements 7, 8, 11 and 12. Therefore, a user may selectively choose which 2×2 area of the 4×4 sensor array 14 provides input to the 2×2 display.

Figures 3A, 3B:
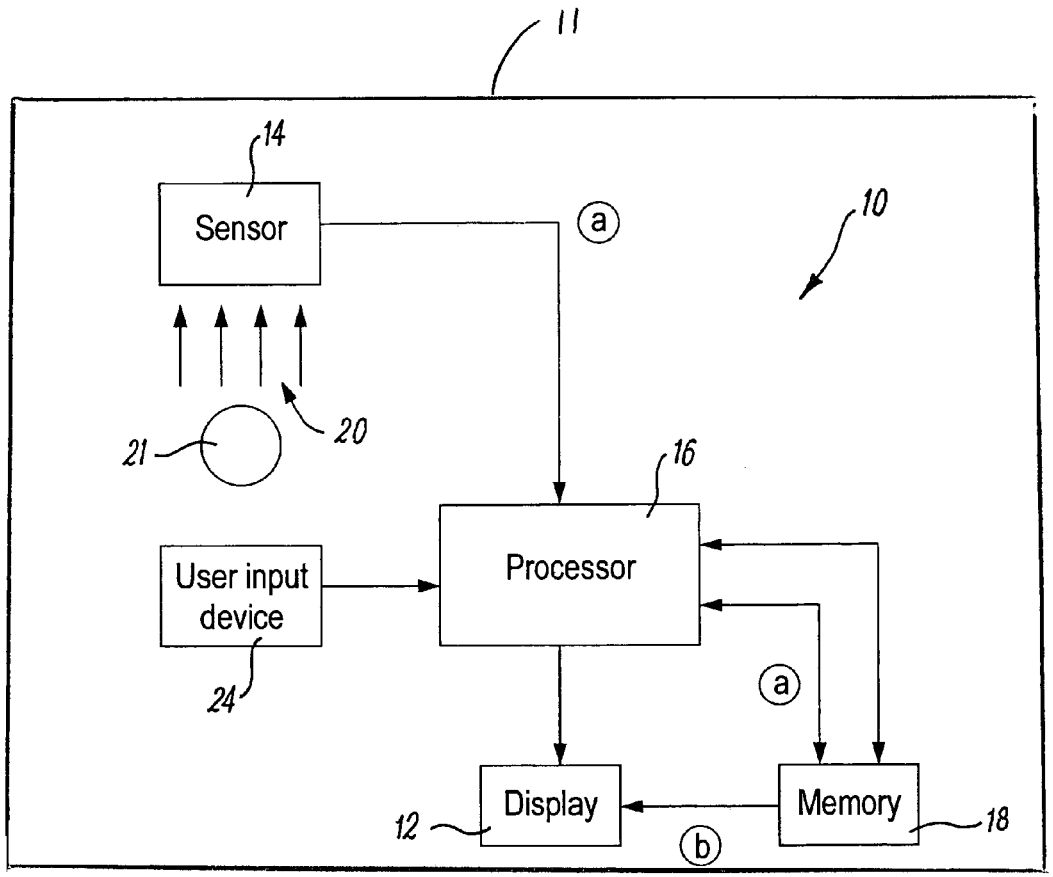
FIGS. 3A & 3B illustrate schematic diagrams of a third embodiment of the present invention.

FIG. 3A illustrates a system 10 for controlling a display 12 according to a third embodiment of the present invention.

The system 10 is similar to the system 10 illustrated in FIG. 1A. Where the features of FIG. 3A correspond to the features of FIG. 1A, the same reference numerals are used.

The sensor array 14 captures image data (a) which is read by the processor 16. The image data (a) comprises MN data elements and corresponds to the output of the whole of the sensor array 14. The image data (a) is then stored in the memory 18 by the processor 16.

At some later time, a user may provide a request to the processor 16 stating that they only wish to view n×m pixels of the stored image. The processor 16 then processes the image data (a) stored in the memory 18 to create display data (b) which is used to control the content of the display 12. The processor 16 reads the image data from the memory 18 and operates on it to produce the display data (b). The operation involves selecting a sub-set from the data elements of the image data. This sub-set corresponds to a first area of the sensor array 14. The first area is an n×m area of contiguous sensors in the sensor array 14 and the sub-set is the nm data elements corresponding to the output of the sensors within the first area.

The display data (b) may be stored in the memory 18 as a separate entity from the image data (a).

In the example of FIG. 3B, the user chooses to view a 2×2 image, and the first area is a 2×2 array of sensors within the top right corner of the sensor array 14. The image data displayed therefore corresponds to the image data elements 3, 4, 7, 8. The 2×2 display is merely illustrative, typically displays will be much larger e.g. an array of 1600×1200 pixels (1,920,000 pixels in total).

The user input device 24 allows a user to change display data (b) without changing the image data (a).

The user may use the user input device 24 to select, as the display data, a different sub-set from the data elements of the stored image data. This different sub-set corresponds to a translation of the first area within the sensor array 14. For example, if the user provides a 'left' command, the first area is translated one to the left so that the display data comprises the image data elements 2, 3, 6 and 7. If the user instead provides a 'down' command, the first area is translated one down so that the display data comprises the image data elements 7, 8, 11 and 12. Therefore, a user may selectively choose which 2×2 area of the 4×4 sensor array 14 provides input to the 2×2 display.

Therefore, the system 10 illustrated in FIG. 3A allows the user to capture the output from the whole of the sensor array as image data (a) and store it in a memory 18. It then allows a user to request the processor 16 to process the stored image (a) to produce display data (b) which corresponds to a first area of a sensor array.

FIG. 4 illustrates the output from the display 12 when embodiments of the present invention are used in combination with digital zoom. Image data (c) comprises thirty six pixels numbered 1 to 36 and corresponds to an entire area of a sensor array. When the image (c) is processed by the processor 16 in accordance with embodiments of the present invention, display data (d) is produced. Display data (d) comprises sixteen data elements from the top right of the image data (c). Image (d) corresponds to the first area of the sensor array and may be translated within the sensor array to produce a different image.

Image (d) may be changed by using digital zoom. Digital zoom allows a user to resize the first area of the sensor array to create a resized image. The centre of the resized image coincides with the centre of the original image and may be larger or smaller than the original image. For example, if image (d) is resized using digital zoom, display data (e) is created which comprises data elements 10, 11, 16 and 17. It will be appreciated by one skilled in the art that the user may first use digital zoom and then translate the first area within the sensor array to produce a new image. Additionally, it should be appreciated that digital zoom may be used simultaneously with embodiments of the present invention.

Although embodiments of the present invention have been described in the preceding paragraphs with reference to various examples, it should be appreciated that modifications to the examples given can be made without departing from the scope of the invention as claimed. For example, the sensor array should not be limited to the number of sensors defined by the examples above and should be regarded as a plurality of sensors. Likewise, the display should not be limited to the number of pixels described in the examples above and should be regarded as a plurality of pixels.

Whilst endeavouring in the foregoing specification to draw attention to those features of the invention believed to be of particular importance it should be understood that the applicant claims protection in respect of any patentable feature or combination of features hereinbefore referred to and/or as shown in the drawings whether or not particular emphasis has been placed thereon.

I claim:

1. A system for displaying an image captured by a sensor array, the system comprising:
    a buffer for storing an output from a first plurality of sensors of a sensor array;
    means for processing the stored output to create an image corresponding to an output from a plurality of sensors within a first area of the sensor array, wherein the plurality of sensors within the first area of the sensor array are a subset of the first plurality of sensors;
    means for displaying the image;
    a memory for receiving and storing the image; and
    means for changing the image displayed by translating the first area, wherein the buffer is for enabling the system to capture the output from the first plurality of sensors at a rate greater than the processing rate of the means for processing.

2. A system as claimed in claim 1, comprising a display for displaying the image corresponding to the output from the plurality of sensors within the first area of the sensor array.

3. A system as claimed in claim 1, comprising a user input device for controlling the translation of the first area within the sensor array.

4. A system as claimed in claim 3, wherein the user input device controls translation in a first direction and, independent translation in a second direction, substantially perpendicular to the first direction.

5. A system as claimed in anyone of claims 3, wherein the first user input device is additionally arranged to resize the first area.

6. A system as claimed in claim 5, wherein the user input device is arranged to simultaneously resize and translate the first area.

7. A system as in claim 6, wherein the system is incorporated in a digital camera.

8. A system as in claim 7, wherein said resizing corresponds to a digital zoom.

9. A system as in claim 8, wherein said translating of said first area is accomplished by a command.

10. A system as in claim 9, wherein resizing forms an image that is larger than said image created by said processing means.

11. A system as in claim 9, wherein resizing forms an image that is smaller than said image created by said processing means.

12. A system as in claim 9, comprising a memory for receiving and storing the image.

13. A system as in claim 12, wherein the memory is a built-in permanent memory.

14. A system as claimed in claim 3, wherein the user input device is connected to the means for processing via a wireless link.

15. A system as claimed in claim 1, wherein the means for displaying an image comprises a processor.

16. A system as in claim 1, wherein the system is incorporated in a digital camera.

17. A system as in claim 1, wherein the memory is a removable memory.

18. A system as in claim 17, wherein the removable memory is a secure digital card.

19. A system as in claim 17, wherein the removable memory is a microdrive.

20. A system as claimed in claim 1, wherein the memory is for receiving and storing the output from the first plurality of sensors of the sensor array.

21. A system as in claim 1, wherein the system is incorporated in a portable handheld device.

22. A system as in claim 21, wherein the portable handheld device is a mobile phone.

23. A system as in claim 21, wherein the portable handheld device is a personal digital assistant.

24. A method for displaying an image, the method comprising:
   temporarily storing an output from a first plurality of sensors of a sensor array;
   processing the stored output to create an image corresponding to an output from a plurality of sensors within a first area of the sensor array, wherein the plurality of sensors within the first area of the sensor array are a subset of the first plurality of sensors;
   displaying the image corresponding to an output from the plurality of sensors within the first area of the sensor array;
   receiving and storing the image in a memory; and
   displaying a different image in response to a user input that is equivalent to translating the first area within the sensor array, wherein the temporary storing of the output from the first plurality of sensors occurs at a rate greater than the processing of the stored output.

25. A system for displaying an image, the system comprising:
   a buffer for storing an output from a first plurality of sensors of a sensor comprising an N×M array of light sensors,
   a processor for processing the stored output to create an image comprising an n×m array of pixels corresponding to an output from an n×m subset of the N×M array of light sensors, wherein the n×m subset of light sensors are a subset of the first plurality of sensors, and for controlling a display to display the image, wherein the corresponding n×m subset is changeable in response to a user input to vary the image for display; and
   a memory for receiving and storing the image, wherein the buffer is for enabling the system to capture the output from the first plurality of sensors at a rate greater than the processing rate of the processor.

* * * * *